United States Patent [19]

Terwilliger et al.

[11] Patent Number: 5,330,224
[45] Date of Patent: Jul. 19, 1994

[54] COLLET CHUCK

[75] Inventors: Donald N. Terwilliger, Elmira; Roger R. Smith, Erin, both of N.Y.

[73] Assignee: Hardinge Brothers, Inc., Elmira, N.Y.

[21] Appl. No.: 114,969

[22] Filed: Sep. 2, 1993

[51] Int. Cl.⁵ ............................................. B23B 31/20
[52] U.S. Cl. ...................................... 279/51; 279/156
[58] Field of Search ......................... 279/51, 58, 156

[56] References Cited

U.S. PATENT DOCUMENTS

| | | |
|---|---|---|
| 3,540,748 | 11/1970 | Buck . |
| 3,542,384 | 11/1970 | Speed . |
| 3,599,997 | 8/1971 | Oliver . |
| 3,779,566 | 12/1973 | Tarbox . |
| 3,841,645 | 10/1974 | Parsons . |
| 4,133,545 | 1/1979 | Komori . |
| 4,505,487 | 3/1985 | Davignon . |
| 4,552,370 | 11/1985 | Baumgartner . |
| 4,702,484 | 10/1987 | Sandwick . |
| 4,786,221 | 11/1988 | March . |
| 5,032,043 | 7/1991 | Hollifield . |
| 5,050,896 | 9/1991 | Peterson . |
| 5,133,566 | 7/1992 | Baker . |

*Primary Examiner*—Steven C. Bishop
*Attorney, Agent, or Firm*—Cushman, Darby & Cushman

[57] ABSTRACT

A collet chuck for holding a tool or workpiece on a spindle of a machine tool. The collet chuck has a hollow collet mount having a rear end to be attached to the spindle. A plurality of radially disposed holes extending from the exterior surface to the interior surface of the collet mount. A cam surface is disposed adjacent the front end on the interior surface. The chuck also has a two-piece, tubular collet with a collet cam adjacent the front end on the exterior surface for interacting with the cam surface of the collet mount. The two-piece collet comprises a collet head with an annular groove adjacent the rear end and a hook portion between the rear end and the groove, and a collet body with a flange portion at its front end. The flange portion of the collet body engages the hook and groove of the collet head. A slot associated with each radially disposed hole is provided in the collet body. The collet body has a draw bar adapter which is threaded to the draw bar mechanism of the spindle in such a way as to limit the stroke length of the collet. A stop member is disposed inside the tubular collet at a clearance from the interior surface of the collet. A pin passes through each radially disposed hole and associated slot and is fixed to the stop. A spring corresponding to each pin is provided for biasing the pin toward the rear of the collet mount. Screws are provided for adjusting the tension of the spring. When the collet is displaced, the collet cam interacts with the cam surface on the collet mount to close the collet, but the displacement of the collet does not affect the axial position of the stop.

20 Claims, 3 Drawing Sheets

COLLET CHUCK

BACKGROUND OF THE INVENTION

1. Field of the Invention

The present invention relates to a collet chuck for holding a tool or workpiece on the spindle of a machine tool. More particularly, the present invention relates to a collet chuck having a dead length work stop.

2. Description of the Prior Art

Collets are sleeves or collars used in various machine tools such as lathes for clamping or gripping workpieces or tools. Collets have conical surfaces or cams, which, when the collet is pulled back, interact with corresponding, opposing surfaces or cams on a mounting fixture or on the spindle. This interaction causes the collet to contract or expand to grasp or release a work piece or tool, depending on the direction of movement. Collet chucks have commonly been used in machine tools in place of other types of chucks. Collet chucks are typically more accurate and have a greater gripping characteristic than a typical jaw chuck, for example. An advantage of collets is that they continue to grasp the workpiece or tool even at high rotational speeds when jaw chucks would have a tendency to loosen their grip due to centrifugal force.

One problem encountered with collet chucks is that slight variations in the diameter of the workpiece or stock could cause the collet to position the workpiece differently. When and where a collet will grasp a work piece depends on the difference in diameter between the open collet and the diameter of the workpiece. Precise workpiece diameter is therefore required if the workpiece is to be positioned precisely and consistently in machining operations such as facing, side finishing or cutting to precise lengths.

Dead length stops of different kinds have been proposed in the art to solve the problem of workpiece positioning with machine collets. One such work stop is disclosed in U.S. Pat. No. 4,505,487 to Davignon et al. The work stop described in this patent comprises a number of fins radiating from the body of the stop in between the slots or segments of the collet. The fins serve to engage the inside of the spindle and therefore fix the stop in a given position. This structure has the disadvantage that it works inside of the spindle to fix the stop. Such a structure, while it may serve to provide a dead stop for a workpiece, is not capable of being incorporated into a collet chuck that can easily replace a normal chuck on a lathe. In other words, it can only be mounted inside the spindle in a lathe or other machine tool that is dedicated to the use of collet chucks.

A collet assembly capable of being mounted in front of the spindle in the manner of a jaw chuck is disclosed in U.S. Pat. No. 5,096,213 to Terwilliger et al. The assembly disclosed in this patent comprises a two-part collet having a collet head and a collet body. The collet head has a conical outer surface at its front end that interacts with a corresponding cam, on the collet mount, and an inside surface for gripping the workpiece. A flange portion at the front end of the collet body engages a hook and groove portion of the collet head, so that if the stroke of the collet exceeds a certain amount. As often happens when the chuck is mistakenly closed without a workpiece in place, the flange of the body "pops" out of the groove, possibly resulting in damage to the collet chuck assembly. This assembly has the disadvantage that there is no way of limiting the stroke of the collet before the flange pops out.

A collet chuck having a dead length stop is disclosed in U.S. Pat. No. 4,702,484 to Sandwick. The disclosed collet chuck has an outer collet body capable of being connected to the spindle of a lathe. A slotted collet, having gripping surfaces on the radially inward portion of the front end and cams on the radially outward portion of this end, is disposed inside the outer collet body. The collet closes in a conventional manner when it is pulled back by a tubular chuck actuating element. The cams of the collet then interact with an external flange at the front end of the outer collet body. The dead length stop is formed by a ring portion which is located radially inward of the collet and has a certain clearance from the collet. The ring is threaded around a cup-like stop. Centering pins, which are threaded into holes in the outer collet body, hold the ring and cup stop in place. The pins are located between the slots of the collet and therefore do not interfere with the functioning of the collet. The position of the stop can be adjusted by turning the externally-threaded cup stop relative to the ring until the stop reaches a desired axial position. A second, rod-like work stop is threaded into the cup-like stop at the axis of rotation and can be positioned independently of the cup stop.

There are, however, certain disadvantages of the above-described collet chuck. Firstly, there is nothing within the chuck itself to limit the stroke of the collet, and excessive stroke will result in damage to the collet. Secondly, variations during manufacture of such collet assemblies result in clearances which could cause the stop to migrate during a machining operation and result in slight variations in the length of pieces machined using this type of collet stop. Also, variations in the machining of the chuck itself can not be compensated for because the pins that position the stop threadedly engage the outer collet body.

In view of the above problems with the prior art collet chucks, it is an object of the present invention to provide a collet chuck that can be readily adapted for use with machine tools in which conventional jaw chucks are also used.

It is another object of the present invention to provide a collet chuck in which the length of the workpiece is determined independently of variations in diameter of the workpiece.

It is a further object of the present invention to provide a collet chuck in which the work stop is adjusted independently of the collet.

It is an object of the present invention to provide a collet chuck in which the stroke of the collet can be limited to prevent damage to the collet.

It also is an object of the present invention to provide a collet chuck with a dead length workstop in which variations in the manufacture of the collet and stop do not affect the accuracy of the length of workpieces obtained using the chuck.

SUMMARY OF THE INVENTION

In accordance with the above objects, the present invention provides a collet chuck for holding a tool or workpiece on a spindle of a machine tool, comprising a hollow collet mount having a rear end to be attached to the spindle, a front end, an exterior surface, an interior surface, a plurality of circumferentially spaced holes extending radially from the exterior surface to the interior surface, and a cam surface adjacent the front end on the interior surface. The chuck also comprises a tubular collet having a front end, a rear end, an interior surface, an exterior surface, a collet cam adjacent the front end on the exterior surface for interacting with the cam surface of the collet mount, and a plurality of slots substantially parallel to an axis of rotation of the spindle, wherein each slot corresponds to a radially disposed hole. The collet also has means for connecting the collet to a displacing mechanism for displacing the collet along an axis. When the collet is displaced, the collet cam interacts with the cam surface on the collet mount to close the collet. A stop member is disposed inside the tubular collet at a clearance from the interior surface of the collet. A pin is provided corresponding to each radially-disposed hole and corresponding slot. Each pin passes through a respective hole and slot corresponding to the hole and is fixed to the stop. A spring or other spring means is provided corresponding to each pin. The spring biases the pin in a direction substantially parallel to the axis.

Preferably, the spring biases the pins toward the rear of the collet mount. Means for adjusting the tension of the spring, such as a screw disposed in a hole substantially perpendicular to the pin, are also preferably provided.

The means for connecting the collet to a displacing mechanism are provided and preferably comprises a threaded draw bar adaptor for being threaded to a draw bar of the machine tool. The draw bar adaptor can be threaded a predetermined distance from the spindle, thereby limiting the stroke of the draw bar. The draw bar adaptor is preferably slidingly disposed along the interior surface of the collet mount.

In a preferred embodiment, the tubular collet comprises a collet head having a front end, a rear end, a circumferential groove adjacent the rear end, and a hook portion between the rear end and the groove. In one embodiment, the collet also comprises a collet body. The collet body has a front end, a rear end, and a flange portion at its rear end for engaging the hook and groove of the collet head.

A seal is preferably disposed between the draw bar adaptor and the interior surface of the collet mount to seal the spindle from contamination. The collet chuck may further comprise a rod stop threaded to the stop member so that the length of the rod stop can be adjusted independently of the position of the stop member.

Further objects, features and advantages of the present invention will become apparent from the Detailed Description of the Preferred Embodiments which follows, when considered together with the attached drawings.

DETAILED DESCRIPTION OF THE PREFERRED EMBODIMENT

Figure 1:
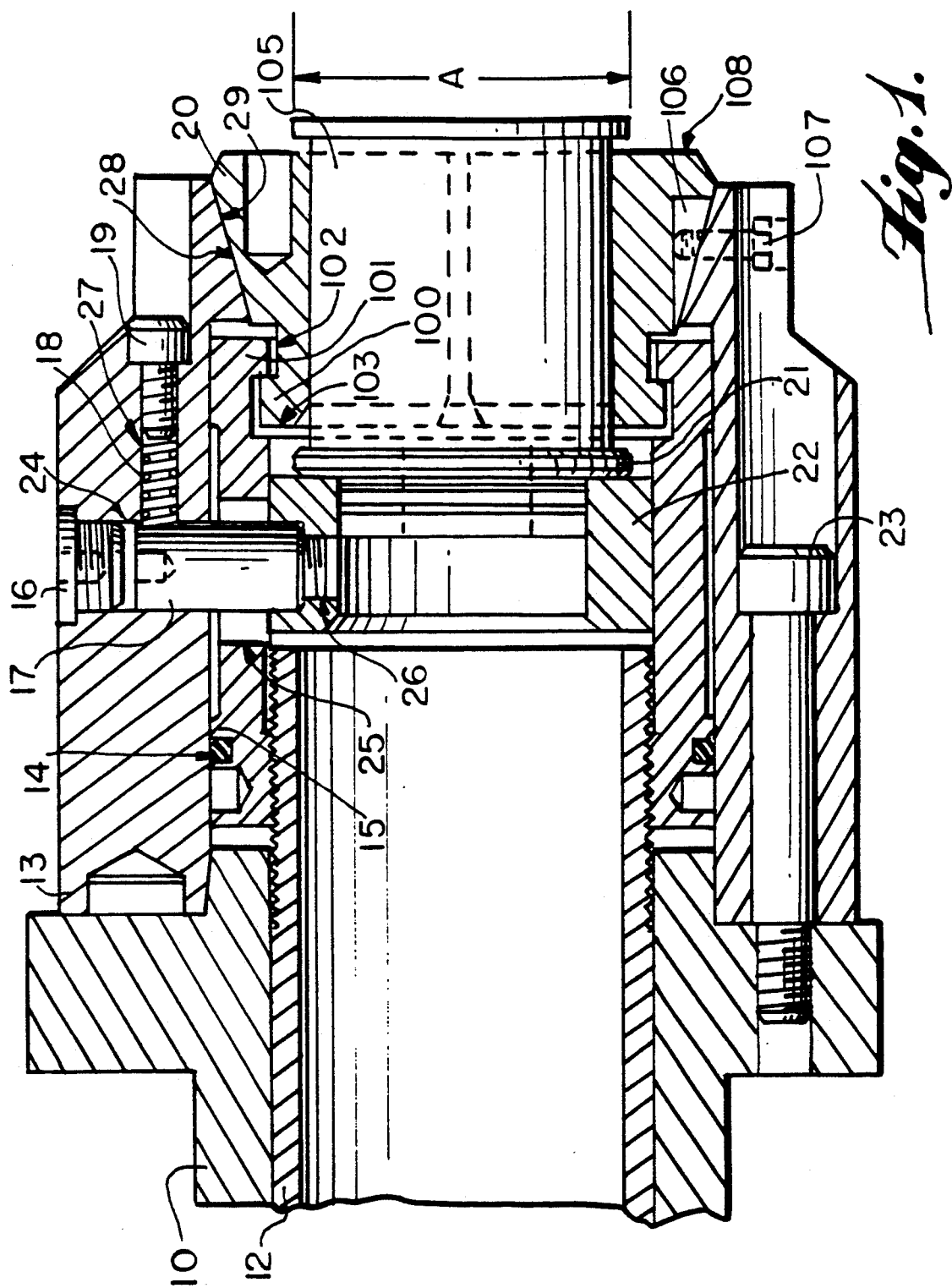
FIG. 1 is a cross-sectional view of the collet chuck according to the present invention.
Figure 2:
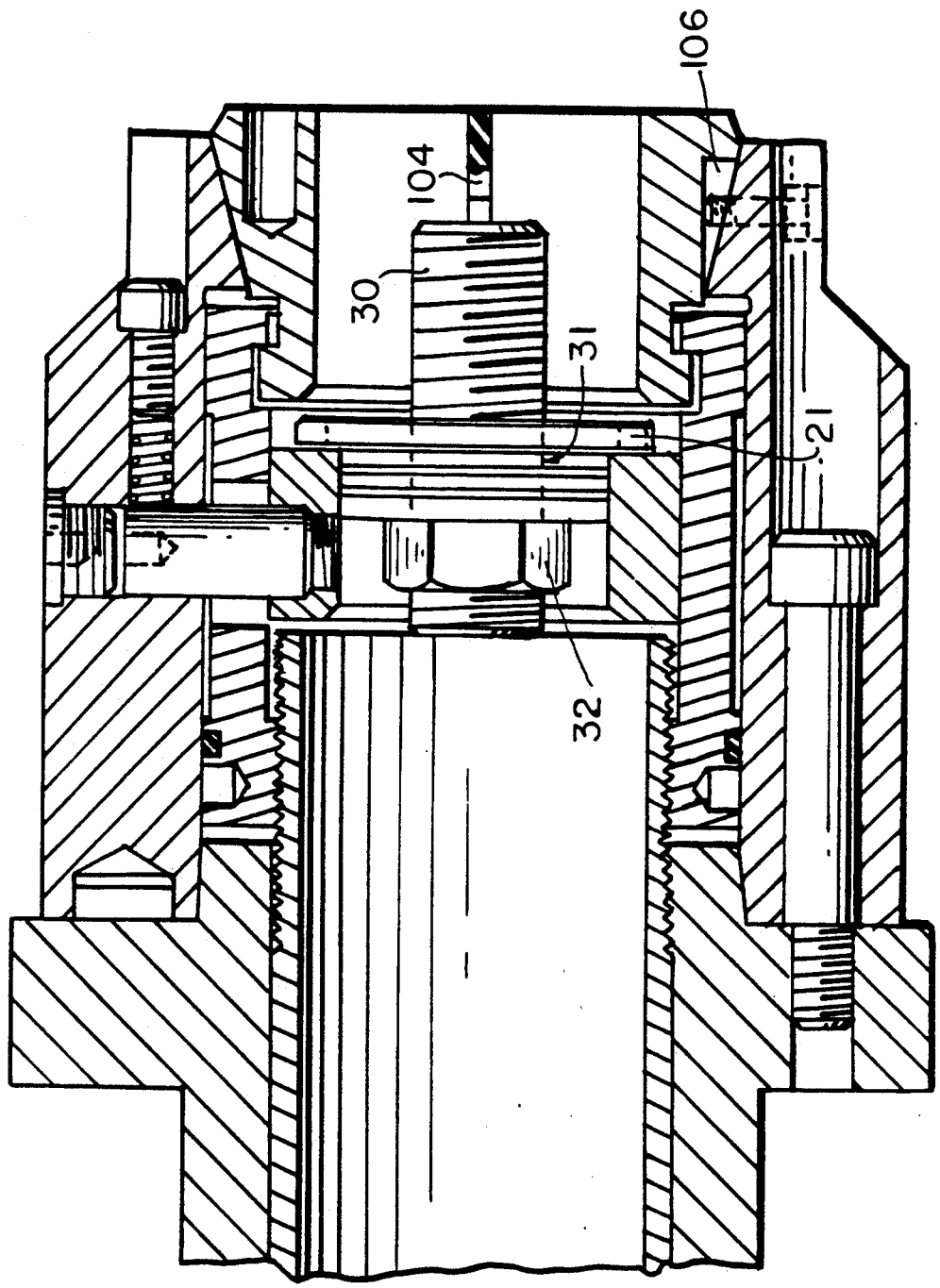
FIG. 2 is a cross-sectional view of a collet chuck having a rod stop according to another embodiment of the present invention.
Figure 3:
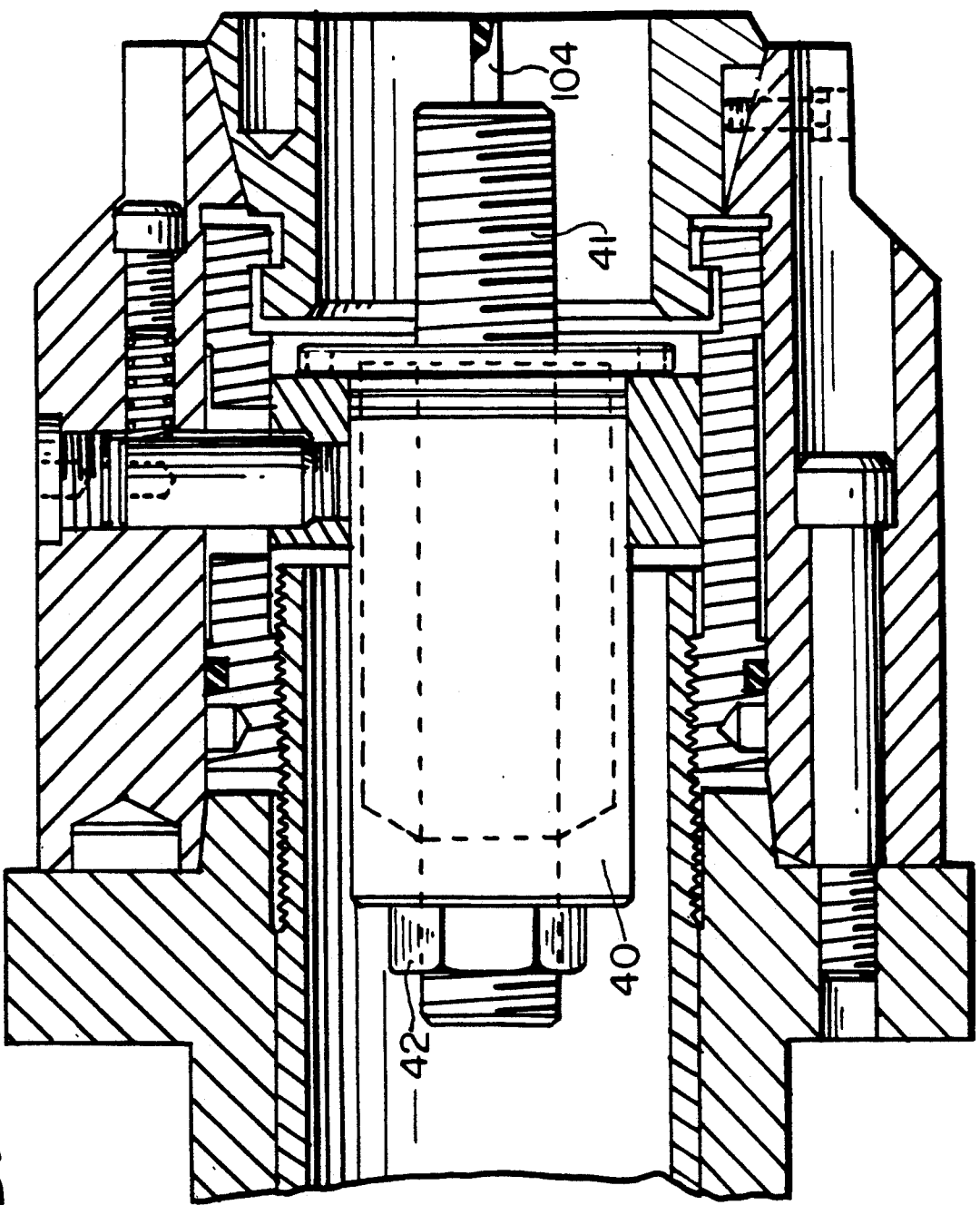
FIG. 3 is a cross-sectional view of a collet chuck having an elongated stop according to a third embodiment of the present invention.

FIGS. 1-3, in which like parts are represented by like reference numerals will be referred to explain the preferred embodiments of the present invention.

Referring to FIG. 1, the collet chuck according to the present invention is seen in cross-section attached to a machine spindle 10 and machine draw bar 12 of a conventional machine tool such as a lathe. Draw bar adaptor 15 is threaded onto machine draw bar 12 until the draw bar adaptor is a predetermined distance from the spindle 10. Collet mount 13 is then secured to spindle 10 by means of three mounting screws 23. The cross-section in FIG. 1 allows only one mounting screw 23 to be seen. Stop mount 22 is slid into draw bar adaptor 15 from the front, or from the right as shown in FIG. 1. Three studs or pins 17 are inserted into holes 24 in collet mount 13 through slots 25 in draw bar adaptor 15 and are threaded into threaded holes 26 on stop mount 12.

As will be appreciated by one of skill in the art, because FIG. 1 is a cross-section of the collet chuck, only one of the three pins 17 can be seen in the figure. Stop mount 22 is inserted into draw bar adaptor 15 with stop body 21 attached so as to make it easier for the pins 17 slots 25 and tapped holes 16 to be aligned.

Compression springs 18 are then inserted into holes 27 in collet mount 13, and are held in place by three cap screws 19. The tension of the compression springs can be adjusted with cap screws 19. The springs preload the pins 17 and thus stop mount 22 in an axial direction toward the rear of the collet mount 13, or toward the left in FIG. 1. Holes 24 are larger than pins 17, so that this positive axial alignment of the stop mount 12 can be accomplished. After the stop mount is aligned using compression springs 18 and cap screws 19, plugs 16 are used to seal the assembly from contaminants such as metal clips and lubricant. An O-ring 14 is provided between draw bar adaptor 15 and the interior surface of collet mount 13 in order to prevent contamination such as metal chips and coolant from entering the machine tool and possibly interfering with the spindle bearings, hydraulic draw tube assembly, etc.

The stop body 21 shown in FIG. 1 can be provided with a stop rod 30 threaded in a tapped hole 31 of stop body 21 and locked in place by nut 32 as shown in FIG. 2. The collet chuck of the present invention also may have the ability to "bury" a part inside the machine draw bar 2 by the use of an elongated stop body 40 as shown in FIG. 3. In FIG. 3, elongated stop body 40 is also provided with a stop rod 41 which is threaded to stop body 40 and locked in place by nut 42.

In either the embodiments of FIG. 2 or FIG. 3, the length of the stop rod 30 can be adjusted as appropriate for machining different length parts. The stop rod can be modified in any of several ways known to those of skill in the art in order to be custom fit to particular workpieces. For example, the end of the stop rod can be turned down to use with smaller diameters. A knob or other attachments can be added to the end of the stop rod to accommodate larger diameter parts. The end of the stop rod can also be drilled for receiving a workpiece, or otherwise machined to rest on the shoulder of or in a recess in a workpiece. As will be readily appreciated by those of skill in the art, the rod 30 or rod 41 can be modified or customized in several conventional ways.

The stop rods 30, 41 the stop body 21 and elongated stop body 40 can all be easily replaced using a conventional or specially-adapted wrench.

The collet head 20 and draw bar adaptor 15 fit together in the manner of the collet assembly disclosed in U.S. Pat. No. 5,096,213 to Terwilliger, which is hereby incorporated by reference.

Just as shown in the Terwilliger patent, the collet head 20 of the present invention is made up of a number of segments locked together by resilient inserts 104 as seen in FIGS. 2 and 3.

In the present invention, collet head 20 has a cam surface 29 which engages and interacts with a corresponding cam surface 28 on the collet mount 13. Toward the rear end of collet head 20, or toward the left in FIG. 1, the collet head 20 is provided with a an annular or circumferential groove 102 and a hook portion 100 between the groove 102 and the rear end 103 of the head 20. A flange 101 of the draw bar adaptor 15 engages the groove 102 and hook portion 100 in a manner as shown in the Terwilliger et al. patent. If a given stroke length is exceeded, then the rear face of the draw bar adaptor shoulders or contacts on the front face of the spindle 10 before the collet itself or the collet mount 13 is damaged.

A key way 106 is provided in one of the segments of collet head 20. Set screw 107, which is secured in collet mount 13, cooperates with key way 106. Key way 106 is set back a small distance from the front face 108 of collet head 20 to prevent debris, dirt and other contaminating matter from entering collet head 20.

The operation of the collet chuck according to the present invention will now be described with reference to FIG. 1. The draw bar adaptor 15 is threaded onto the machine draw bar 12. The collet mount 13 is then screwed to the machine spindle 1, and the stop mount 22 and stop body 11 are positioned by means of the pins 17 and compression springs 18. After plugs 16 seal holes 24, the collet chuck is ready to be used.

A workpiece such as the plug 105 shown in FIG. 1 is inserted in the collet head until it abuts the stop body 21, and the draw bar 12 is actuated so that the draw bar 12, O-ring 14, draw bar adaptor 15 and collet head 20 all move to the left in FIG. 1. The draw bar adaptor 15 is therefore slidingly disposed within the collet mount 13. Because of the interaction of cam surfaces 29 and 28 on the collet head 20 and collet mount 13, respectively, collet head 20 closes and grips plug 105. The position of the stop mount 22 and stop body 21 is unaffected by the actuation of the machine draw bar 12. Stop mount 22 is slidingly disposed within draw bar adapter 15.

If a one-piece collet is provided integral with the draw bar adapter 15, then a clearance would need to be provided between the stop mount 22 and the draw bar adaptor 15. This clearance would need to be sufficient to prevent any contraction of the draw bar adaptor 15, in response to the interaction of the cam surfaces 28, 29, from gripping the stop mount 22.

After the plug 105 is gripped by the collet head 20, the plug 105 can be machined in any desired fashion.

Because the stop body 21 remains stationary while the draw bar 12 is actuated, and the stop body 21 operates to limit axial movement of of plug 105, the length of plug 105 gripped by the collet head 20 does not depend on the outer diameter "A" (see FIG. 1) of the plug 105 itself. When, for example, the machining operation is a facing operation, a uniform length part can be obtained despite variations in the diameter of the part.

In a collet assembly in which the stop is a part of the assembly that moves when the draw bar is actuated, the length of the part within the collet will vary due to diameter variations in the workpiece according to the following formula:

$$\delta L = \frac{\delta D/2}{\tan \phi}$$

In the formula, $\delta D$ is the diameter variation of the workpiece, $\delta L$ is the variation in length of the workpiece, and $\phi$ is the closing angle of the collet per side.

For example, if the closing angle of the collet is 10° per side, then the length of the part within the collet will vary 0.0028 inches for each 0.001 inches variation in grip diameter.

EXAMPLE

The following test was carried out using the collet chuck according to the present invention.

Twenty three brass plugs similar to plug 105 shown in FIG. 1 were made. Five pieces were made to have a diameter "A" of 0.542". This diameter corresponded to the gripping diameter of the collet head used. The remaining eighteen pieces were made in varying diameters ranging from 0.527" (−0.015" from the gripping diameter) to 0.557" (+0.015" from the gripping diameter). The original length of the plugs was approximately 1 inch to within ±0.01".

The plugs were gripped as shown in FIG. 1 along the portion having the diameter "A" as shown in FIG. 1.

A first plug having a diameter of 0.542" was faced to a length of 0.980" and chamfered. The remaining plugs were then faced and chamfered without changing any machine settings. The remaining 0.542" plugs were machined first, and then plugs having diameters less than and greater than the 0.542" gripping diameter of the collet were machined alternately until all plugs were machined.

The length of the plugs was then checked on a shadow gauge. The gauge was zeroed on the first 0.542" diameter plug machined.

The length of each plug as measured on the shadow gauge was recorded. Since the two ends of the plug were not perfectly square or perfectly flat, the length reading varied slightly around the plug. The length recorded was the shortest length measured. The greatest length variation for a single plug recorded was 0.0005 inches. The results of the measurements are reproduced in the following table.

| Diameter "A" (inches) | Variation of "A" From 0.542" (inches) | Length Variation (inches) |
| --- | --- | --- |
| 0.527 | (−.015) | 0.0000 |
| 0.531 | (−.011) | 0.0000 |
| 0.534 | (−.008) | −0.0002 |
| 0.537 | (−.005) | −0.0001 |
| 0.539 | (−.003) | 0.0000 |
| 0.540 | (−.002) | +.0001 |
| 0.5405 | (−.0015) | +.0001 |
| 0.541 | (−.001) | +.0001 |
| 0.5415 | (−.0005) | +.0001 |
| 0.542 | (0) | 0.0000 |
| 0.542 | (0) | +.0003 |
| 0.542 | (0) | +.0002 |
| 0.542 | (0) | −.0001 |
| 0.542 | (0) | +.0001 |
| 0.5425 | (+.0005) | +.0001 |
| 0.543 | (+.001) | 0.0000 |
| 0.5435 | (+.0015) | +.0001 |
| 0.544 | (+.002) | +.0001 |
| 0.545 | (+.003) | +.0002 |
| 0.547 | (+.005) | +.0002 |
| 0.550 | (+.008) | +.0002 |
| 0.553 | (+.011) | +.0001 |

| Diameter "A" (inches) | Variation of "A" From 0.542" (inches) | Length Variation (inches) |
| --- | --- | --- |
| 0.557 | (+.015) | +.0001 |

Gauge was zeroed on this plug.

As can be seen from the above table, the length of the machined plugs varied only very slightly. While not wishing to be limited to any particular theory, this very slight variation could be attributed to a number of factors, such as the lack of squareness or flatness of the faces of the original plugs, the lack of any temperature control during machining, or machine or tooling inaccuracies. The greatest variation observed was 0.0003". The data indicates that there is no measurable relationship between the diameter "A" of the plug and any variation in the length of the machined parts. It can therefore be concluded that the length of the machined plugs did not vary measurably within the ±0.15" variation in the diameter.

While the Example demonstrates the machining of workpieces using the collet chuck of the present invention, one of skill in the art will recognize that the chuck may also be used to hold tools where appropriate.

While the present invention has been illustrated by means of several preferred embodiments, one of ordinary skill in the art will also recognize that changes, modifications and improvements can be made while still remaining within the scope and spirit of the present invention. The scope of the invention is determined in accordance with the appended claims.

What is claimed is:

1. A collet chuck for holding a tool or workpiece on a spindle of a machine tool, comprising:
    a hollow collet mount having a rear end to be attached to the spindle, a front end, an exterior surface, an interior surface, a radially disposed hole extending from the exterior surface to the interior surface, and a cam surface adjacent the front end on the interior surface;
    a tubular collet having a front end, a rear end, an interior surface, an exterior surface, a collet cam adjacent the front end on the exterior surface for interacting with the cam surface of the collet mount, and a slot formed in the collet, wherein the slot is associated with said radially disposed hole, and means for connecting the collet to a displacing mechanism for displacing the collet along said axis, wherein, when the collet is displaced, the collet cam interacts with the cam surface to close the collet;
    a stop member disposed inside the tubular collet at a clearance from the interior surface of the collet;
    a pin passing through the hole and the slot and being attached to the stop member; and
    a spring biasing the pin substantially along said axis.

2. A collet chuck according to claim 1, comprising a plurality of radially disposed holes extending from the exterior surface of said collet mount to the interior surface of said collet mount, a plurality of slots in the tubular collet, each slot being associated with a radially disposed hole, and a plurality of pins, each pin passing through a radially disposed hole and the slot associated with that hole and being fixed to the stop member.

3. A collet chuck according to claim 2, wherein said plurality of radially disposed holes are equally spaced around a circumference of said collet mount.

4. A collet chuck according to claim 1, wherein the spring biases the pin toward the rear of said collet mount.

5. A collet chuck according to claim 1, further comprising means for adjusting the tension of said spring.

6. A collet chuck according to claim 5, wherein said means for adjusting comprises a screw disposed in a second hole in said collet mount substantially perpendicular to said pin.

7. A collet chuck according to claim 5, further comprising a plug for sealing said radially-disposed hole in said collet mount.

8. A collet chuck according to claim 1, wherein said means for connecting comprises a threaded draw bar adapter for being threaded to a draw bar of said machine tool, and wherein the draw bar adapter can be threaded a predetermined distance from said spindle, thereby limiting the stroke of the drawbar.

9. A collet chuck according to claim 8, wherein said draw bar adapter is slidingly disposed along the interior surface of the collet mount.

10. A collet chuck according to claim 1, wherein said tubular collet further comprises a collet head having a front end, a rear end, an annular groove adjacent the rear end, and a hook portion between the rear end and the groove; and a collet body having a front end and a rear end, and having a flange portion at the rear end of the collet body for engaging the hook and groove of the collet head.

11. A collet chuck according to claim 10, wherein said means for connecting comprises a threaded draw bar adapter for being threaded to a draw bar of said machine tool; wherein the draw bar adapter is threaded a predetermined distance from said spindle thereby limiting the stroke of the drawbar; and wherein said draw bar adapter is connected to the rear end of the collet body.

12. A collet chuck according to claim 8, further comprising a seal disposed between the draw bar adapter and the interior of the collet mount to seal the spindle from contamination.

13. A collet chuck according to claim 11, further comprising a seal disposed between the draw bar adapter and the interior of the collet mount to seal the spindle from contamination.

14. A collet chuck according to claim 1, further comprising a rod stop having a length and being threaded to the stop member, wherein the length can be adjusted independently of the position of the stop member.

15. A collet chuck according to claim 1, wherein the stop member is hollow for receiving tools or workpieces, and has a length extending along said axis rearward of said pins.

16. A collet chuck for holding a tool or workpiece on a spindle of a machine tool, comprising:
    a hollow collet mount having a rear end to be attached to the spindle, a front end, an exterior surface, an interior surface, a radially-disposed hole extending from the exterior surface to the interior surface, and a cam surface adjacent the front end on the interior surface;
    a tubular collet having a front end, a rear end, an interior surface, an exterior surface, a collet cam adjacent the front end on the exterior surface for interacting with the cam surface of the collet mount, and a slot associated with the radially disposed hole, and means for connecting the collet to a displacing mechanism for displacing the collet along said axis, wherein when the collet is displaced the collet cam interacts with the cam surface to close the collet;

a stop member disposed inside the tubular collet at a clearance from the interior surface of the collet;

a pin passing through the hole and the slot and being fixed to the stop member; and a spring means for biasing said stop member substantially in a direction of the axis.

17. A collet chuck according to claim 16, comprising a plurality of radially disposed holes extending from the exterior surface of said collet mount to the interior surface of said collet mount, a plurality of slots in the tubular collet, each slot being associated with a radially disposed hole, and a plurality of pins, each pin passing through a radially disposed hole and the slot associated with that hole and being fixed to the stop member.

18. A collet chuck according to claim 17, wherein said plurality of radially disposed holes are equally spaced around a circumference of said collet mount.

19. A collet chuck according to claim 16, wherein the spring means bias said stop member toward the rear of said collet mount.

20. A collet chuck according to claim 19, wherein said spring means acts on said pin, and thereby biases said stop member.

* * * * *